United States Patent [19]

Martin

[11] Patent Number: 4,801,193
[45] Date of Patent: Jan. 31, 1989

[54] RETROREFLECTIVE SHEET MATERIAL AND METHOD OF MAKING SAME

[75] Inventor: David C. Martin, Berlin, Conn.

[73] Assignee: Reflexite Corporation, New Britain, Conn.

[21] Appl. No.: 164,184

[22] Filed: Mar. 4, 1988

[51] Int. Cl.⁴ .................. G02B 5/124; G02B 5/136
[52] U.S. Cl. .................................. 350/103; 350/109; 350/320
[58] Field of Search ............. 350/320, 102, 103, 106, 350/109; 427/166

[56] References Cited

U.S. PATENT DOCUMENTS

| | | | |
|---|---|---|---|
| 1,734,979 | 11/1929 | Persons | 350/103 |
| 3,684,348 | 8/1972 | Rowland | 350/103 |
| 3,689,346 | 9/1972 | Rowland | 350/103 |
| 3,830,682 | 8/1974 | Rowland | 350/103 |
| 4,145,112 | 3/1979 | Crone et al. | 350/103 |
| 4,244,683 | 1/1981 | Rowland | 425/143 |
| 4,555,161 | 11/1985 | Rowland | 350/103 |
| 4,637,950 | 1/1987 | Bergeson | 350/103 |
| 4,703,999 | 11/1987 | Benson | 350/103 |

Primary Examiner—John K. Corbin
Assistant Examiner—Ronald M. Kachmarik

[57] ABSTRACT

A retroreflective sheeting has microretroreflective formations on one surface which are partially metallized and partially exposed to the atmosphere about them. It is produced by forming a coating on microprism surface, and this coating includes a thin metallic deposit over substantially the entire surface and a second coating material over only a portion of the surface. The coated surface is then exposed to a solvent to remove the coating from its predominant area and leave the metal deposit on only a minor portion of the area. A backing sheet is then applied over the microprisms and bonded to the retroreflective sheeting so as to leave an air interface about the predominant area of the microprisms. As a result, some light rays are retroreflected by the metal deposit and some are retroreflected by the atmosphere interface. The sheeting exhibits daytime whiteness over the bulk of its surface area.

24 Claims, 4 Drawing Sheets

RETROREFLECTIVE SHEET MATERIAL AND METHOD OF MAKING SAME

BACKGROUND OF THE INVENTION

The present invention relates to retroreflective sheeting employing microprism formations to retroreflect the light rays impinging thereon, and more particularly, to a method for producing such retroreflective sheet material exhibiting a high degree of whiteness and retroreflectivity, and to the sheet materials produced thereby.

Retroreflective sheet material is widely employed for a variety of safety and decorative purposes, and is particularly useful when night time visibility is significant under conditions of low ambient light. In retroreflective materials, the light rays impinging upon the front surface are reflected back towards the source of the illumination in a substantially parallel path. In situations where headlights or search lights, boats and aircraft are the only source of illumination, this ability to retroreflect the bulk of the rays falling thereon is especially significant.

Minnesota Mining and Manufacturing Corporation has manufactured retroreflective sheeting utilizing minute glass beads embedded in a matrix of synthetic resin to provide such retroreflection, and these materials have been sold under the trademark SCOTCHLITE. Illustrative of such materials is Bergeson et al U.S. Pat. No. 4,637,950 granted Jan. 20, 1987.

Applicant's assignee, Reflexite Corporation, has been marketing under the trademark REFLEXITE, reflective sheeting employing microprisms formations to produce such retroreflection. Illustrative of such materials is Rowland U.S. Pat. No. 3,689,346 granted Sept. 5, 1972.

Among the applications for such retroreflective materials are reflective tapes and patches for clothing of firemen, reflective vests and belts, bands for posts and barrels, traffic cone collars, highway signs, warning reflectors, and the like.

It is known that a cube corner prism surrounded by air will retroreflect light incident upon the front surface or base thereof impinging upon and the prism surfaces. However, it is common to coat the prism surfaces with a reflective or specular material such a vacuum deposited aluminum layer to provide a retroreflective interface. In this manner, adhesive and other backing materials may be deposited around the cube corner prisms for lamination to backing sheets and other structures.

Moreover, when using microprisms of less than about 0.010 inch on center spacing, it has been found that there is less retroreflection of light incident at an angle of 30° or more if the surfaces of the microprisms are unmetallized. Thus, when making such microprism sheeting, it is desirable to have some portion of the microprisms coated with a specular material which will have the tendency to reflect light impinging at higher angles of incidence.

The use of a metallized aluminum coating on the prism surfaces tends to produce a grey coloration to the observer in ambient light or daylight conditions. In some applications, this grey appearance is considered aesthetically undesirable.

To prevent or minimize the failure of such retroreflective sheet materials incident to penetration of salt or other corrosive materials, or moisture, about the retroreflective formations, it is common to provide a protective backing over the formations and to seal that backing to the retroreflective sheeting in a grid pattern to produce discrete cells containing isolated clusters of retroreflective formations. Illustrative of such grid structures is Bergeson et al U.S. Pat. No. 4,637,950 granted Jan. 20, 1987.

It is an object of the present invention to provide a novel sealed retroreflective sheeting using microprism formations overlaid by a protective backing element and which exhibits high reflectivity and a desirable degree of whiteness to the observer in daylight.

It is also an object of the present invention to provide such a retroreflective sheet material which may be readily fabricated and which is durable and resistant to the elements. Another object of the present invention is to provide novel methods for fabricating such retroreflective sheet material which are relatively simple and relatively economical, and which produce long-lived materials.

SUMMARY OF THE INVENTION

It has now been found that the foregoing and related objects can be readily attained in a process for producing a retroflective sheeting having microretroreflective formations on one surface which is partially metallized and partially exposed to the atmosphere about them.

A retroreflective sheeting is formed with microretroreflective formations closely spaced about one surface thereof, and these formations are configured to retroreflect light entering the other surface of the sheeting and impinging upon the inner surface of the formations.

A coating comprising a thin metallic deposit is formed on one surface over substantially the entire surface of the formations and a second coating material is formed over only a portion of the formations. The metallic deposit and second coating material are superposed over a portion of the one surface.

A solvent is applied to the one surface to remove the coating from the predominant surface area of the formations. This exposes the surface while leaving a residual coating providing a metal deposit on the surface of the formations over a minor portion of the surface area.

A backing element is adhered to the one surface, and it extends in a plane generally above the formations and is spaced from the predominant surface area of the formations to leave the surface area exposed to the atmosphere thereabout. As a result, light rays entering the other surface of the sheeting and impinging upon the residual coating are reflected thereby, and those impinging upon the exposed surface area are reflected by the interface with the atmosphere.

In one embodiment of the process, the coating step initially deposits metal over substantially the entire area of the one surface and thereafter deposits an organic protective coating material over only a portion thereof. The solvent application step removes the metal deposit in the areas unprotected by the coating material.

Preferably, the organic coating material is applied in a grid pattern, and the coating material is an adhesive and the backing element is bonded thereto. The solvent is a solvent for the metal, the metal is aluminum, and the solvent is an alkali metal hydroxide solution.

In another embodiment of the process, the coating step initially deposits the second coating material over the majority of the area of the one surface with portions of the formations being uncoated thereby. Metal is then deposited over the entire surface area. The solvent application step removes the coating material, and the metal deposit overlies the coating material to leave the metal deposit in the areas where directly deposited on the surface.

The coating material preferably includes an organic resin, and the solvent may include a solvent for the resin.

The coating material may include magnesium hydroxide or magnesium carbonate hydroxide, and the solvent may be a detergent solution.

The resultant retroreflective sheet material comprises a retroreflective sheeting having a multiplicity of closely spaced microretroreflective formations on one surface thereof with a reflective metal deposit on a minor portion of the area of the one surface. A backing sheeting is adhered to the one surface of the reflective sheeting, and extends in a plane generally above the formation and is spaced from the predominant surface area of the formations. The major area of the one surface is free from the metal deposit and from contact with the backing sheeting to provide an atmospheric interface thereat. The light rays entering the other surface of the sheeting and impinging upon the metal deposit are reflected thereby. Those impinging upon the metal-free surface area are reflected by the atmospheric interface.

Preferably, the coating includes an adhesive superposed on the metal deposit.

The microretroreflective formations are cube corner prisms, and the metal deposit is in a grid-like pattern. The backing sheeting is adhered to the reflective sheet along the grid-like pattern.

DETAILED DESCRIPTION OF THE ILLUSTRATED EMBODIMENTS

Figure 6:
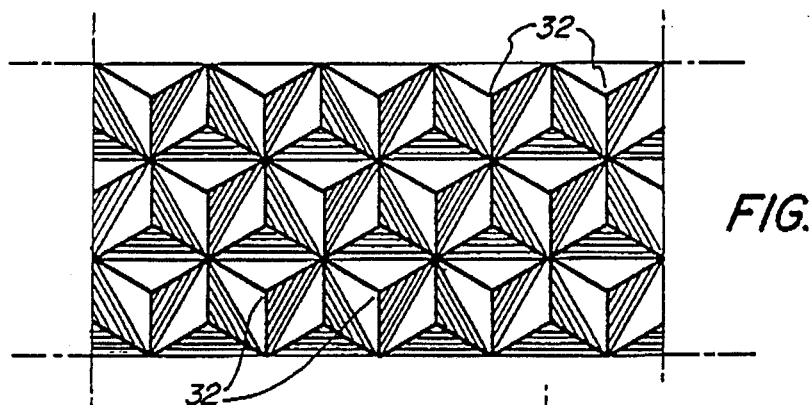
FIG. 6 is a plan view to a greatly enlarged scale showing the microprism retroreflective formations.

Turning first to FIG. 6 of the attached drawings, therein is illustrated a fragmentary and greatly enlarged plan view of the microprisms 32 which are formed on the rear surface of the retroreflective sheeting. The microprisms are closely spaced and can be described as cube corner formations. Further details concerning the structure and operation of such microprisms may be found in Rowland U.S. Pat. No. 3,684,348 granted Aug. 15, 1972. These microprisms or cube corner formations may have a side edge dimension of up to 0.025 inch, but the preferred structures use edge dimensions of not more than 0.010 inch, and most desirably on the order of 0.004-0.008 inch. The body portion of the sheeting will generally have a thickness on the order of 0.002-0.030 inch and preferably about 0.003-0.010 inch depending upon the method of fabrication, the resins, and the characteristics desired for the retroreflective sheeting.

A particular advantageous method for making such retroreflective sheeting is described and claimed in Rowland U.S. Pat. No. 3,689,346 granted Sept. 5, 1972 in which the cube corner formations are cast in a cooperatively configured mold and are bonded to sheeting which is applied thereover to provide a composite structure in which the cube corner formations project from the one surface of the sheeting.

Another method for fabricating such microprism sheeting is shown in Rowland U.S. Pat. No. 4,244,683 granted Jan. 13, 1981 in which the cube corner formations are produced by embossing a length of sheeting in suitable embossing apparatus with precisely formed molds in a manner which avoids entrapment of air.

As previously indicated, it is customary to provide a backing sheet behind the microprisms so as to protect them and to provide a smooth surface for application of the structure to support surfaces. To effect lamination of such a backing sheet to the retroreflective sheeting, adhesives and ultrasonic welding are generally employed. When adhesives are employed, the adhesives tend to wet the surface of the microprisms and this destroys the air innerface and eliminates their ability to retroreflect. Accordingly, it has been customary to deposit a reflective coating upon the surfaces of the microprisms before the laminating operation, and such reflective coatings have most commonly been vacuum metallized aluminum deposits, although metal lacquers and other specular coating materials have also been used.

It has long been known that the harsh conditions to which the retroreflective material may be exposed in marine and highway applications can produce penetration between the backing sheet and the microprisms. This results in corrosion and delamination of the structure. Thus, it has been common to produce sealed cells of relatively small area by producing a sealing bond between the backing sheet and the retroreflective sheeting. Grid-like patterns to achieve this result are disclosed in Bergeson et al U.S. Pat. No. 4,637,950 granted Jan. 20, 1987.

Figure 1:
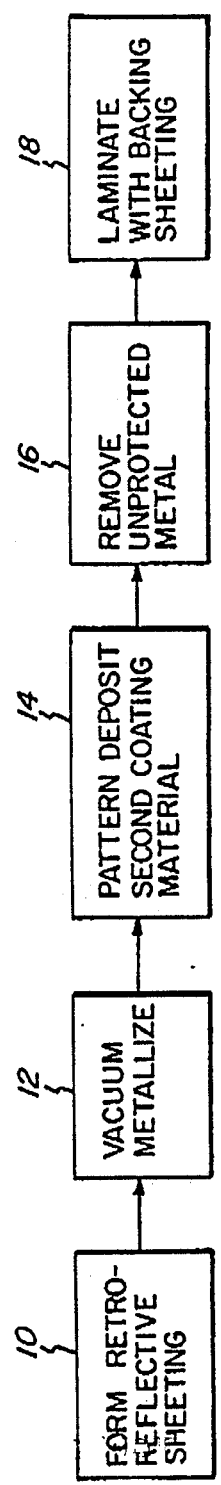
FIG. 1 is a diagrammatic view of a method for making the improved retroreflective sheeting of the present invention.

Turning now to FIGS. 1 and 3, therein illustrated is a preferred method for producing the retroreflective sheeting of the present invention. In the first step shown diagrammatically the box 10 in FIG. 1, the retroreflective sheeting is formed with a body portion 30 with retroreflective formations on the one surface thereof as seen in FIG. 3A. This retroreflective sheeting is then vacuum metallized on its one surface in a vacuum metallizing apparatus designated by the numeral 12 so as to deposit uniformly over the entire surface of the sheeting, a thin deposit 34 of the reflective metal, conventionally aluminum, as seen in FIG. 3B.

Figure 3A:
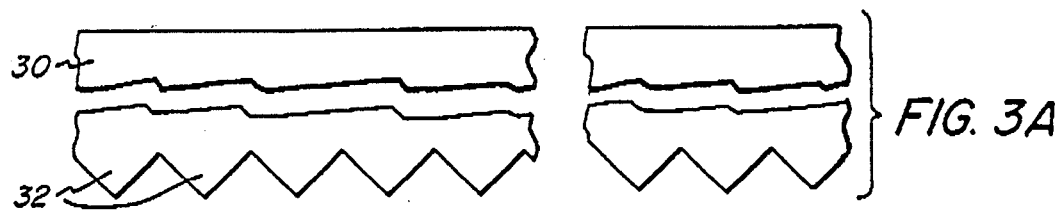
FIGS. 3A-3E are diagrammatic views of the reflective sheeting (greatly enlarged) at various points in the process of FIG. 1.
Figure 3B:
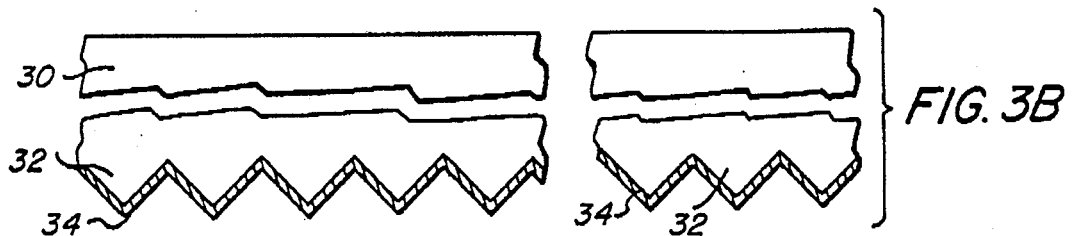
Figure 3C:
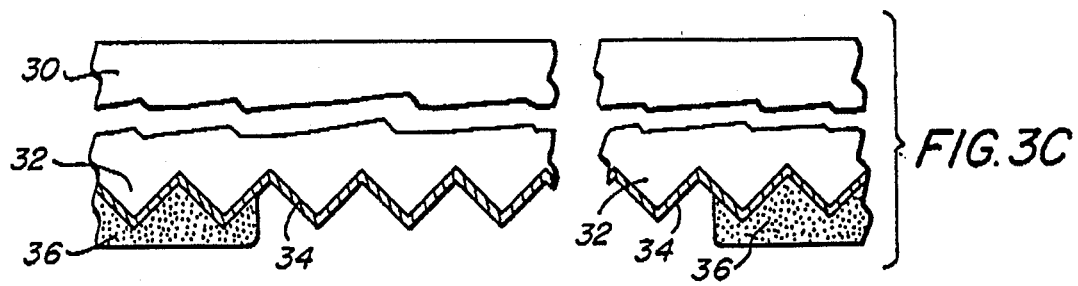
Figure 3D:
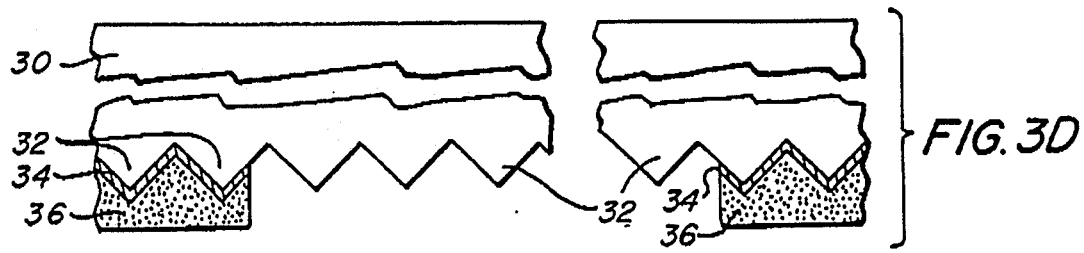
Figure 3E:
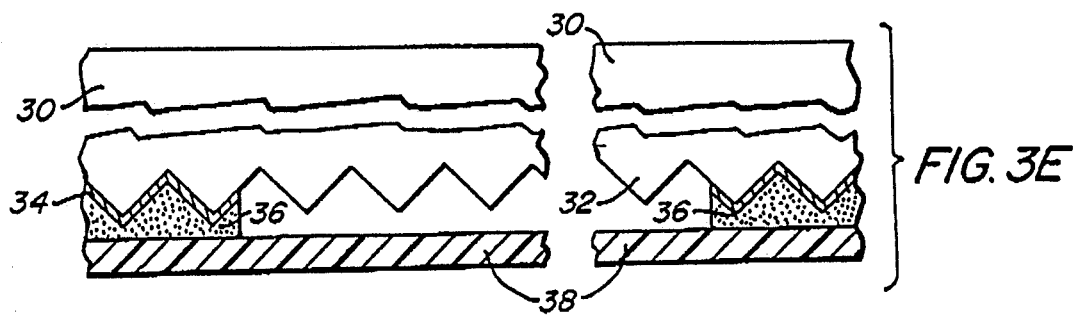
Figure 4A:
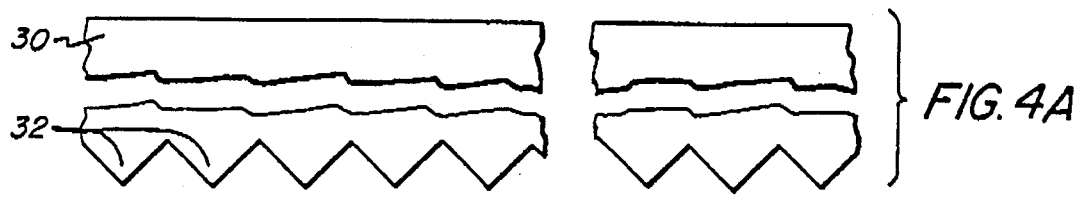
FIGS. 4A-4E are similar diagrammatic views of the reflective sheeting at various points in the process of FIG. 2.
Figure 4B:
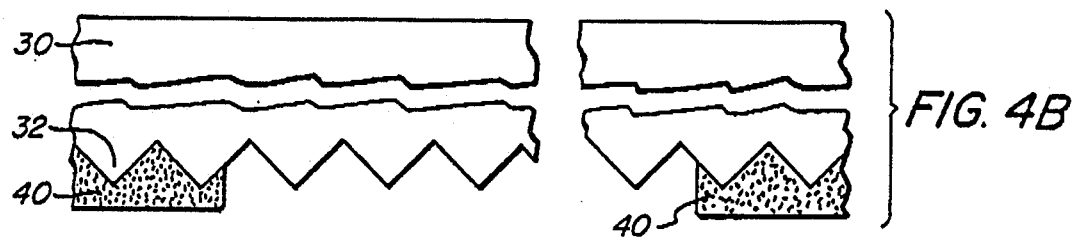
Figure 4C:
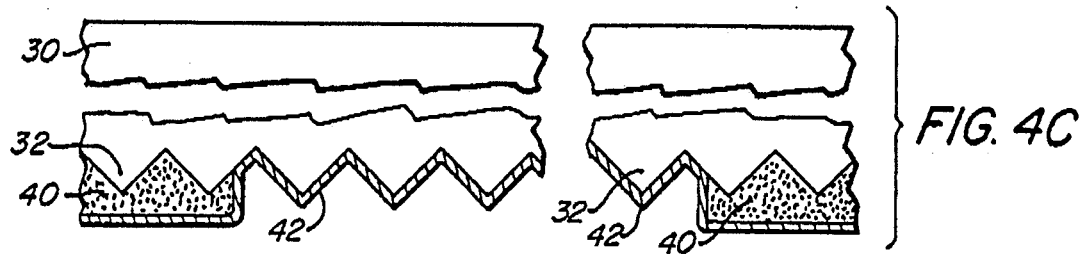
Figure 4D:
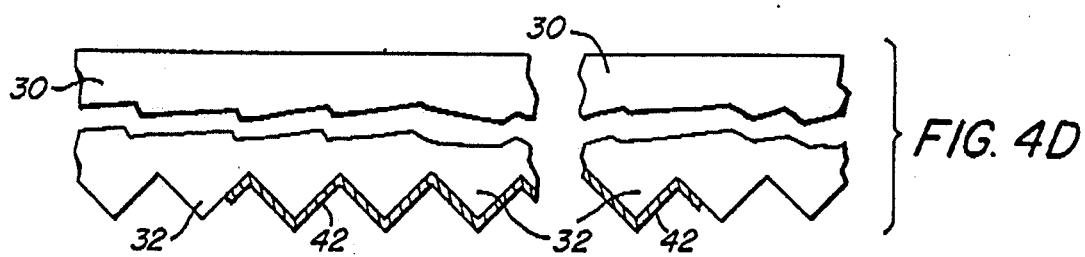
Figure 4E:
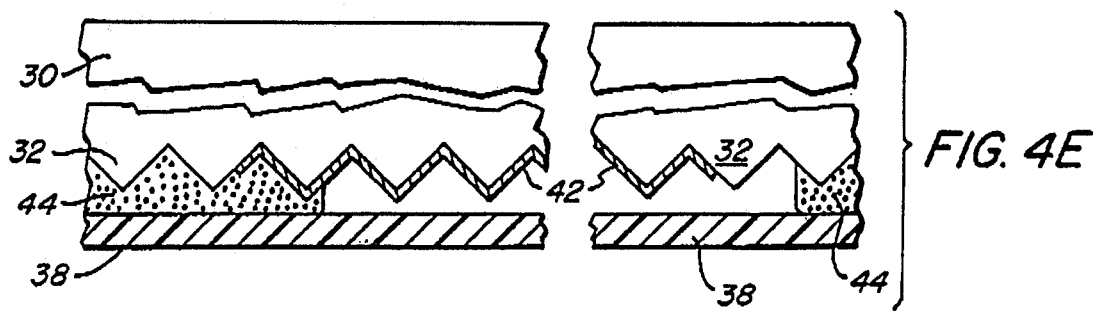

In the next step in a coating apparatus 14, the vacuum metallized surface is then printed with a grid-like pattern of a second coating material as indicated by the numeral 36 in FIG. 3C so that, in a grid pattern, there is now a composite of underlying metal deposit 34 and overlying coating material 36.

The coated surface is now subjected to treatment in a solvent both for the deposited metal as shown by the numeral 16 in FIG. 1. That portion of the metal coating 34 which is not protected by the second coating material 36 is removed by the solvent in this step so as to leave the prisms 32 within the areas bounded by the grid free from any coating.

In the last step as indicated by the numeral 18, the backing sheeting 38 is bonded by the coating material 36 to the retroreflective sheeting to produce the composite structure.

Figure 2:
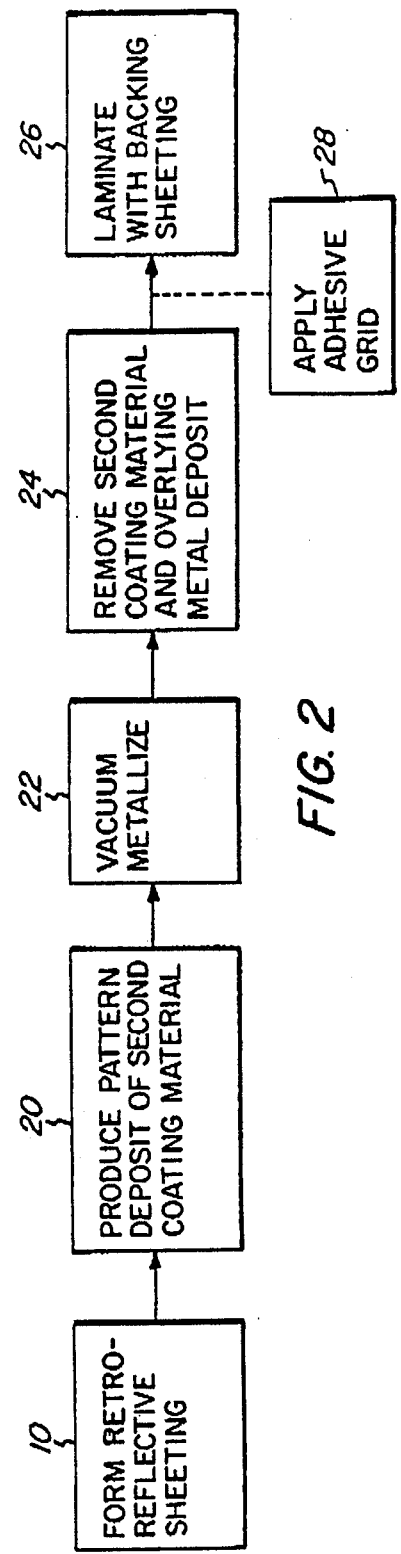
FIG. 2 is a diagrammatic view of another embodiment of a method for making the sheeting of the present invention.

Turning now to FIGS. 2 and 4, another embodiment of the method of the present invention is therein illustrated. In the first step designated by the numeral 10 in FIG. 2, the retroreflective sheeting is similarly formed with a body portion 30 and the microprism formations 32. In the second step 20, a coating material 40 is deposited upon the microprism surface of the sheeting on a grid-like pattern.

In the next step indicated by the numeral 22, the sheeting is vacuum metallized to produce a metallic deposit 42 over both the coating 40 and the uncoated prism surfaces.

In the next step designated by the numeral 24, the coated surface is subjected to solvent action which dissolves the second coating material 40, and thereby removes the metal layer 42 lying thereover. This leaves the metallic deposit 42 that has been directly deposited upon the surfaces of the prisms 32.

Although the laminating step 26 may be effected without an adhesive through use of ultrasonic bonding or other suitable techniques, generally it is preferable to produce a grid-like pattern of adhesive 44 on the surface of the retroreflective sheeting and thereafter to bring the backing sheeting 38 into contact therewith to effect the lamination.

In either of the techniques shown in FIGS. 1 and 3, or in FIGS. 2 and 4, the result is that limited areas of the microprisms are coated with the metal deposit, and the predominant surface area of the prisms is free from any coating. The backing sheeting 38 extends in a plane spaced above the prisms 32. As a result, the bulk of the surface area of the microprisms is surrounded by air or other atmosphere.

Figure 7:
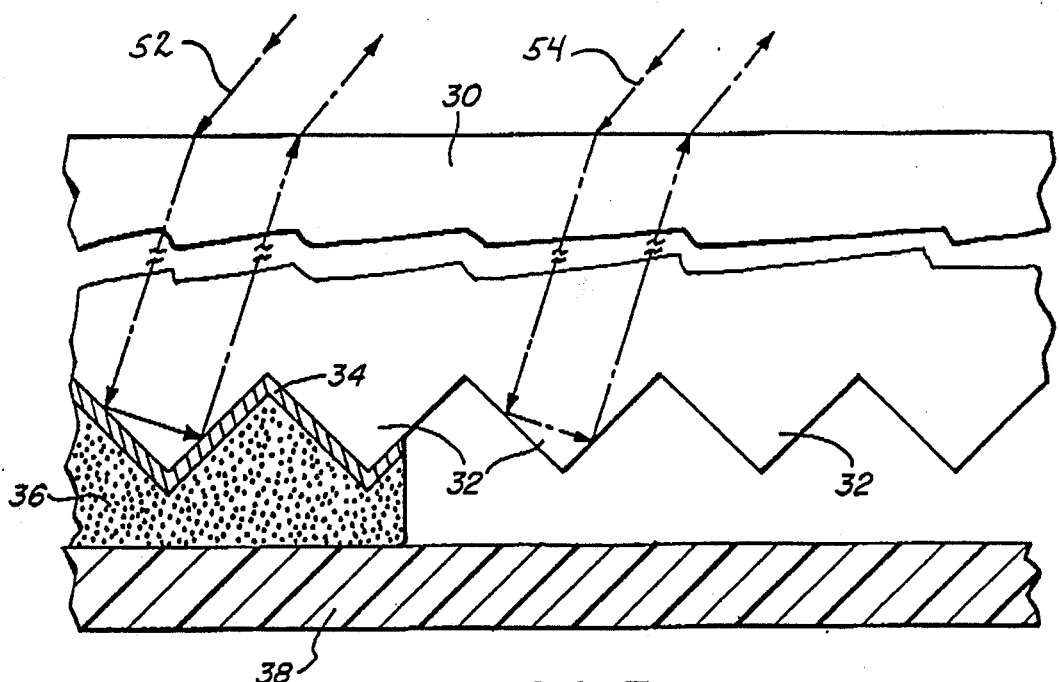
FIG. 7 is a diagrammatic view of the reflective sheeting showing the paths of light rays entering through the front surface.

As seen in FIG. 7, a light ray 52 entering through the front surface of the body portion of the retroreflective sheeting 30 is initially refracted and impinges upon the leftward surface of the microprism 32 and is reflected at a right angle to the rightward surface of the microprism from which it is reflected upwardly and outwardly of the sheeting in a parallel path.

The light ray 54 is similarly refracted when it enters into the sheeting 30, and it impinges upon the leftward prism surface. It is reflected to the rightward prism surface and then reflected outwardly.

Figure 5:
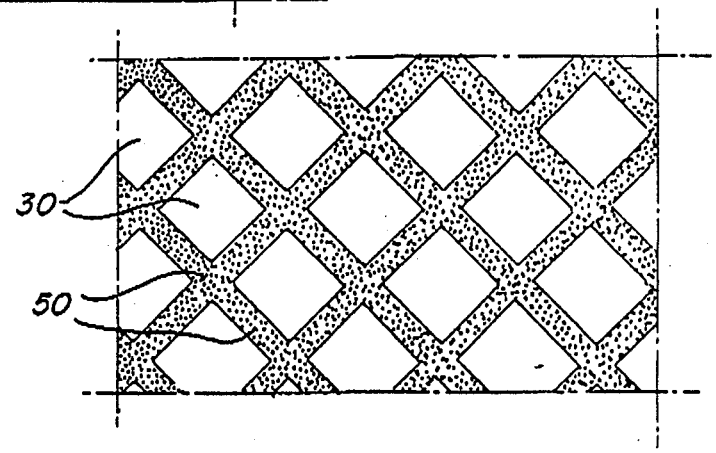
FIG. 5 is a diagrammatic plan view of the sheeting showing a grid pattern for the reflective coating in the sheeting of FIGS. 3 and 4.

In FIG. 5, a grid-like visual pattern produced upon observation of sheeting embodying the present invention will be seen in ambient light. The dark grid pattern represents areas colored grey by the aluminum deposit as seen in the ambient light whereas the lighter areas between the grid lines are characteristic of the uncoated prisms when viewed under ambient light conditions.

Illustrative of the present invention are the following specific examples:

EXAMPLE ONE

Utilizing the method generally illustrated in Rowland U.S. Pat. No. 3,689,346, microprisms having a height of 0.0028 inch and a spacing of 0.006 inch on center were cast upon a polyester film having a thickness of 0.002 inch. The resin employed for the prism was an acrylated epoxy oligomer modified with monofunctional and trifunctional acrylic monomers.

The retroreflective sheeting was vacuum metallized with aluminum to a thickness in excess of 240 Angstroms. The metallized sheeting was then imprinted by a modified gravure roll with a grid pattern of a pressure sensitive, ever-tacky rubber based adhesive sold by B. F. Goodrich under the designation A1569B. The grid has a spacing of ¼ inch between lines and the lines have a thickness of approximately 0.04 inch. Following printing of the grid pattern, the sheeting is passed through a 1.0M. solution of sodium hydroxide for a period of 10–30 seconds during which the unprotected aluminum deposit is removed. The sheeting is then passed through a water bath to rinse the surface, and thence through a dryer. Following drying the sheeting is passed through the nip of a pair of pressure rollers together with a polyethylene backing sheet of 0.001 inch thickness to effect lamination thereof.

The resulting sheet material is found to exhibit excellent weathering characteristics is a weatherometer, excellent retroreflective characteristics, and desirable daytime whiteness.

EXAMPLE TWO

In a process similar to that illustrated in FIG. 2, the retroreflective sheeting described in Example One was initially coated with an offset printing roll to produce a polka dot coating. The composition applied was an aqueous solution of milk of magnesia and a commerically available white latex paint in a ratio of 1:1. After drying, the sheeting was vacuum metallized over the coating with aluminum. Following vacuum metallizing, the sheeting was passed through an aqueous detergent composition which was being rapidly agitated and which removed the coating material initially applied and the aluminum deposited thereover. The sheeting was then rinsed and dried. Upon inspection, approxmatley 40% of the surface area was covered by the metallized aluminum deposit.

The retroreflective sheeting was then passed through a grid sealing machine wherein a heat activatable polymeric film of 0.003 inch was grid sealed to the retroreflective sheeting.

Upon inspection, the resultant retroreflective sheet material was found to exhibit good retroreflectivity, good weathering in a weatherometer, and desirable daytime whiteness.

As previously indicated, the microprism sheeting may be formed by casting prisms upon a film service as a body, or by embossing a preformed sheeting, or by casting both body and prisms concurrently. Generally, the resins employed for the microprism sheeting are cross linked thermoplastic formulations, and desirably these resins provide flexibility, light stability, and good weathering characteristics. In some instances, the front face of the retroreflective sheeting may be provided with a protective coating such as by application of a lacquer or other coating material. Suitable resins for the retroreflective sheeting include vinyl chloride, polymers, polycarbonates, methyl methacrylate polymers, polyurethanes and acrylated urethanes.

The backing sheet will also be a flexible, durable polymeric material. Suitable resins include polyethylene, polypropylene, polyurethanes, acrylated polyurethanes and ethylene/vinyl acetate copolymers.

Although other metals may be used to provide a specular metal deposit including silver, rhodium, copper, tin, zinc, and palladium, the preferred and most economical processes utilize aluminum vacuum deposition. Other deposition techniques include electroless plating, electroplating, ion deposition and sputter coating.

The second coating material utilized in the processes of the present invention will depend upon the process employed and whether adhesive characteristics are desired. In the preferred technique illustrated in FIGS. 1 and 3, the coating material is desirably a pressure sensitive adhesive which will not be unduly affected in the solvent treating step. Preferred adhesives include rubber based systems in solvent carriers and acrylic-based adhesives in solvent systems. Other adhesives may also be employed, and water based systems may also be employed, although sometimes requiring drying time before further processing. Specific examples of suitable adhesive systems are a rubber based, resin modified adhesive sold by B. F. Goodrich under the designation A1569-B, a latex rubber-based adhesive sold by Emhart Industries, Bostik Division, under the designation 8786X and a latex rubber-based system sold by B. F. Goodrich under the designation 26171.

Whether using solvent-based or water based systems, the coating may require drying before further processing. If so, heating may be utilized to accelerate the process.

The second coating material may also be a heat activatable adhesive, or it may be a non-adhesive organic or inorganic coating material. Moreover, the second coating material may be provided by a film of resin, perforated or otherwise formed, so as to encompass only limited portions of the surface.

In the preferred process wherein the metal deposit is to be removed where it is not protected, the solvent conveniently comprises a solution of alkali metal hydroxide or other alkaline solution which will dissolve the aluminum. In the instance of coatings other than metals, solutions with which the metal will react are employed.

In the process illustrated in FIG. 2, the solvent solution is one which will dissolve or remove the second coating material. In some instances, this will be a solvent for the second coating material; and, in other instances, it may be a strong detergent solution accompanied by agitation to lift off the coating material because of its poor bond to the underlying surface.

The step of adhering the backing sheet to the retroreflective sheeting may simply involve passing the adhesive coated retroreflective sheeting through the nip of a pair of rolls together with a backing sheet to apply the necessary pressure to effect adhesion. If a heat activatable adhesive is employed, the retroreflective sheeting may be subjected to preheating prior to passage through the rolls, or the rolls may be heated to achieve the necessary activation. However, it is also practicable to employ ultrasonic welding and other techniques to bond the backing sheet to the retroreflective sheeting by the material of the backing sheet itself.

Where the adhesive coating is applied in the process of FIG. 1 or in the modification of the process of FIG. 2, a grid-like pattern of adhesive may be deposited on the retroreflective sheeting by means of a modified gravure-type roll.

Thus, it can be seen from the foregoing detailed description and attached drawings that the process of the present invention provides a novel retroreflective microprism sheet material exhibiting good daytime whiteness and excellent nighttime retroreflectivity. The material combines retroreflection from metal coated surfaces and air interface surfaces to provide optimum retroreflection over a wide range of angles of incidence. The methods for making the sheeting are relatively simple and economical, and produce material exhibiting long life.

Having thus described the invention, what is claimed is:

1. In a process for producing a retroflective sheeting having microretroreflective formations on one surface which are partially metallized and partially exposed to the atmosphere about them, the steps comprising:
   (a) forming a retroreflective sheeting having microretroreflective formations closely spaced on one surface thereof, said formations being configured to retroreflect light entering the other surface of said sheeting and impinging upon the surface of said formations;
   (b) forming a coating on said one surface comprising a thin metallic deposit providing a first coating material over substantially the entire surface of said formations and a second coating material over only a portion of said formations, said metallic deposit and second coating material being superposed over a portion of said one surface;
   (c) applying a solvent to said one surface to remove said metallic deposit from the major portion of the surface area of said formations and thereby expose the surface thereof where said metallic deposit is removed while leaving a partial coating of said metallic deposit on the surface of said formations over a minor portion of the surface area; and
   (d) adhering a backing element to said one surface, said backing element extending in a plane generally above said formations and being spaced from said major portion of said surface area of said formations to leave said surface area exposed to the atmosphere thereabout, whereby light rays entering the said other surface of said sheeting and impinging upon said residual coating are reflected thereby and those impinging upon said exposed surface area are reflected by the interface with the atmosphere.

2. The process in accordance with claim 1 wherein said step of forming a coating comprises initially depositing said metal over substantially the entire area of said one surface and thereafter depositing an organic protective coating material as said second coating material and over only a portion thereof, and wherein said solvent application step removes said metallic deposit in the areas unprotected by said protective coating material.

3. The process in accordance with claim 2 wherein said organic coating material is applied in a grid pattern.

4. The process in accordance with claim 2 wherein said organic protective coating material is an adhesive and said backing element is bonded thereto.

5. The process in accordance with claim 2 wherein said solvent is a solvent for said metal of said metallic deposit.

6. The process in accordance with claim 5 wherein said metal of said metallic deposit is aluminum and wherein said solvent is an alkali metal hydroxide solution.

7. The process in accordance with claim 2 wherein said protective coating material is an adhesive which is applied in a grid pattern over said metallic deposit on said one surface, and wherein said solvent application removes the metallic deposit unprotected thereby, and wherein said backing sheeting is adhered to said retroreflective sheeting in a grid pattern by heat activation of said adhesive.

8. The process in accordance with claim 7 wherein said metal of said metallic deposit is almuminum deposited by vacuum deposition and said aluminum is removed by an alkali metal solution.

9. The process in accordance with claim 1 wherein said step of forming a coating comprises initially depositing said second coating material over the major portion of the area of said one surface with portions of said formations being uncoated thereby, and depositing the metal of said metallic deposit over the entire surface area, and wherein said solvent application step removes said second coating material and the metallic deposit overlying said second coating material to leave said metallic deposit in the areas where directly deposited on said surface.

10. The process in accordance with claim 9 wherein said second coating material includes an organic resin.

11. The process in accordance with claim 9 wherein said solvent is a solvent for said resin.

12. The process in accordance with claim 11 wherein said second coating material includes a magnesium carbonate hydroxide and wherein said solvent is a detergent solution.

13. The process in accordance with claim 9 wherein a said second coating material is water-soluble and is applied to said one surface in a pattern to provide discontinuities in the layer provided thereby.

14. The process in accordance with claim 9 wherein said adhering step includes the deposition of an adhesive to said one surface in a grid-like pattern.

15. A retroreflective sheet material comprising:
(a) retroreflective sheeting having a multiplicity of closely spaced microretroreflective formations on one surface thereof with a coating on a minor portion of said one surface, said coating including a reflective metallic deposit on a minor portion of the area of said one surface; and
(b) backing sheeting adhered to said one surface of said reflective sheeting, and extending in a plane generally above the formations and spaced from the predominant surface area exposed to the atmosphere, the major portion of the area of said one surface being free from said coating and from contact with said backing sheeting to provide an atmosphere interface thereat, whereby light rays entering the said other surface of said sheeting and impinging upon said metallic deposit are reflected thereby and those impinging upon said metal free surface area are reflected by the atmospheric interface.

16. The retroreflective sheet material in accordance with claim 15 wherein said coating includes an adhesive superposed on said metallic deposit.

17. The retroreflective sheet material in accordance with claim 15 wherein said coating includes adhesive disposed on said one surface in a grid-like pattern, and wherein said backing sheeting is adhered to said reflective sheeting along said grid-like pattern.

18. The retroreflective sheet material in accordance with claim 15 wherein said coating is in a grid-like pattern, wherein said metallic deposit is a vacuum metallized deposit of aluminum, and wherein said coating includes a layer of adhesive overlying said aluminum deposit and bonding said backing sheeting to said retroreflective sheeting.

19. The retroreflective sheet material in accordance with claim 18 wherein said formations between the lines of the grid pattern are substantially free from said coating and have an atmospheric interface.

20. The retroreflective sheet material in accordance with claim 15 wherein said coating includes an adhesive disposed on said one surface in a grid-like pattern and wherein a portion of the formations between the lines of said grid-like pattern have said metallic deposit thereon.

21. In a process for producing a retroflective sheeting having microretroreflective formations on one surface which are partially metallized and partially exposed to the atmosphere about them, the steps comprising:
(a) forming a retroreflective sheeting having microretroreflective formations closely spaced on one surface thereof, said formations being configured to retroreflect light entering the other surface of said sheeting and impinging upon the surface of said formations;
(b) forming a coating on said one surface by first depositing a thin metallic deposit providing a first coating material over substantially the entire surface of said formations and thereafter depositing a second coating material on said metallic deposit over only a minor portion of said formations, said second coating material comprising a protective organic adhesive;
(c) applying a solvent for the metal of said metallic deposit to said one surface to remove said metallic deposit in the areas unprotected by said second coating material and thereby from the major portion of the surface area of said formations to expose the surface thereof, said removal leaving a partial coating of said metallic deposit and second coating material on the surface of said formations over a minor portion of the surface area; and
(d) adhering a backing element to said second coating material on said one surface, said backing element extending in a plane generally above said formations and being spaced from said major portion of said surface area of said formations to leave said surface area exposed to the atmosphere thereabout, whereby light rays entering the said other surface of said sheeting and impinging upon said residual coating are reflected thereby and those impinging upon said exposed surface area are reflected by the interface with the atmosphere.

22. In a process for producing a retroreflective sheeting having microretroreflective formations on one surface which are partially metallized and partially exposed to the atmosphere about them, the steps comprising:
(a) forming a retroreflective sheeting having microretroreflective formations closely spaced on one surface thereof, said formations being configured to retroreflect light entering the other surface of said sheeting and impinging upon the surface of said formations;
(b) forming a coating on said one surface by first depositing a second coating material over the major portion of said formations, and thereafter forming a thin metallic deposit comprising a first coating material over substantially the entire surface of said formations, said metallic deposit and second coating material being superposed over only a minor portion of said one surface;
(c) applying a solvent for said second coating material to said one surface to remove said second coating material and the overlying metallic deposit from the major portion of the surface area of said formations and thereby to expose the surface thereof, said metallic deposit remaining on the surface of said formations over a minor portion of the surface area;
(d) depositing an adhesive upon said one surface in a grid-like pattern; and
(e) adhering a backing element to said adhesive on said one surface, said backing element extending in a plane generally above said formations and being spaced from said major portion of said surface area of said formations to leave said surface area exposed to the atmosphere thereabout, whereby light rays entering the said other surface of said sheeting and impinging upon said residual metallic deposit are reflected thereby and those impinging upon said exposed surface area are reflected by the interface with the atmosphere.

23. A retroreflective sheet material comprising:
(a) retroreflective sheeting having a multiplicity of closely spaced microretroreflective formations on one surface thereof with a coating on a minor portion of said one surface, said coating including a reflective metallic deposit on a minor portion of the area of said one surface and an adhesive superposed on said metallic deposit; and
(b) backing sheeting adhered to said adhesive on said one surface of said reflective sheeting, and extending in a plane generally above the formations and spaced from the predominant surface area exposed to the atmosphere, the major portion of the area of said one surface being free from said coating and from contact with said backing sheeting to provide an atmosphere interface thereat, whereby light rays entering the said other surface of said sheeting and impinging upon said metallic deposit are reflected thereby and those impinging upon said metal free surface area are reflected by the atmospheric interface.

24. A retroreflective sheet material comprising:
(a) retroreflective sheeting having a multiplicity of closely spaced microretroreflective formations on one surface thereof with a coating on a minor portion of said one surface, said coating including a reflective metallic deposit and an adhesive disposed in a grid-like pattern, only a minor portion of the surface area of the formations between the lines of said grid-like pattern having said metallic deposit thereon, the major portion of the surface area of said one surface being free from said metallic deposit and said adhesive; and
(b) backing sheeting adhered to said adhesive on said one surface of said reflective sheeting, and extending in a plane generally above the formations and spaced from the predominant surface area exposed to the atmosphere, the major portion of the area of said one surface being free from said coating and from contact with said backing sheeting to provide an atmosphere interface thereat, whereby light rays entering the said other surface of said sheeting and impinging upon said metallic deposit are reflected thereby and those impinging upon said metal free surface area are reflected by the atmospheric interface.

* * * * *